United States Patent
Brückner et al.

(10) Patent No.: US 7,460,560 B2
(45) Date of Patent: Dec. 2, 2008

(54) METHOD FOR OPERATING AN END-USER OF AN ISOCHRONOUS CYCLICAL COMMUNICATION SYSTEM

(75) Inventors: Dieter Brückner, Unterleiterbach (DE); Dieter Klotz, Fürth (DE); Karl-Heinz Krause, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 761 days.

(21) Appl. No.: 10/493,254

(22) PCT Filed: Oct. 4, 2002

(86) PCT No.: PCT/DE02/03752

§ 371 (c)(1),
(2), (4) Date: Apr. 16, 2004

(87) PCT Pub. No.: WO03/036832

PCT Pub. Date: May 1, 2003

(65) Prior Publication Data

US 2005/0018626 A1 Jan. 27, 2005

(30) Foreign Application Priority Data

Oct. 17, 2001 (DE) ............... 101 50 671
Sep. 5, 2002 (DE) ............... 102 41 191

(51) Int. Cl.
*H04J 3/06* (2006.01)
(52) U.S. Cl. ............... 370/508; 370/428; 370/395.62; 370/352
(58) Field of Classification Search ............... 370/512, 370/520, 236, 493, 395.43, 352, 353, 395.31, 370/395.32, 395.62, 400, 462, 463, 503, 370/507–509, 516, 412, 428, 429; 375/354–365, 375/372; 710/8, 52, 62, 300
See application file for complete search history.

(56) References Cited

U.S. PATENT DOCUMENTS

| | | | |
|---|---|---|---|
| 4,502,137 A | 2/1985 | Tan | |
| 4,768,190 A * | 8/1988 | Giancarlo | 370/400 |
| 5,768,350 A * | 6/1998 | Venkatakrishnan | 379/93.08 |
| 6,351,821 B1 * | 2/2002 | Voth | 713/600 |

FOREIGN PATENT DOCUMENTS

| | | |
|---|---|---|
| DE | 42 15 380 A1 | 11/1993 |
| DE | 197 10 971 A1 | 9/1998 |
| DE | 100 04 425 A1 | 1/2002 |

* cited by examiner

*Primary Examiner*—Doris To
*Assistant Examiner*—Ian N Moore

(57) ABSTRACT

A method for operating an end-user of an isochronous cyclical communication system, including the following steps: receipt of a synchronisation data telegramme from a connecting user in the communication system by the end-user, whereby the synchronisation data telegramme is affected by the run time of a transmission run between the connecting user and the end-user, synchronisation of a time base of the end-user via the synchronisation data telegramme, resulting in a synchronisation of the time base with a tolerance corresponding to the run time, cyclical processing of a transmission list by the end user within a communication cycle corresponding to the time base of the end user, whereby the transmission of a data telegramme occurs according to the transmission list from the end user to the connecting user at the earliest at the beginning of the communication cycle and at the latest at a point equivalent to the tolerance before the projected transfer time point of the relevant data telegramme by the communication user.

5 Claims, 4 Drawing Sheets

⊘ End user without specific hardware support
○ End user with specific hardware support
⊛ Connecting user with specific hardware support

METHOD FOR OPERATING AN END-USER OF AN ISOCHRONOUS CYCLICAL COMMUNICATION SYSTEM

CROSS REFERENCE TO RELATED APPLICATIONS

This application is the U.S. National Stage of International Application No. PCT/DE02/03752, filed Oct. 4, 2002 and claims the benefit thereof. The International Application claims the benefits of German application No. 10150671.6 filed Oct. 17, 2001, and of German application No. 10241191.3 filed Sep. 5, 2002, all three of the applications are incorporated by reference herein in their entirety.

FIELD OF INVENTION

The invention relates to a method for operating an end user of an isochronous communication system and to an end user, a connecting user, and corresponding computer program products.

BACKGROUND OF INVENTION

A synchronous, clocked communication system with equidistance properties is understood as being a system comprising at least two users interconnected via a data network for the purpose of reciprocally exchanging or, as the case may be, reciprocally transmitting data. Data is thereby exchanged cyclically in equidistant communication cycles predefined by the communication clock employed by the system.

An equidistant deterministic cyclical data exchange in communication systems is based on a clock or, as the case may be, time base shared by all the components participating in the communication. The clock or, as the case may be, time base is transmitted to the other components by an indicated component (clock beater). In the case of isochronous realtime Ethernet the clock or, as the case may be, time base is predefined by a synchronizing master by the transmission of synchronizing telegrams.

Users are, for example, central automation devices, programming, planning or operating devices, peripheral devices such as, for example, input/output modules, drives, actuators, sensors, stored-program controls (SPCs), or other control units, computers, or machines which exchange electronic data with other machines, in particular which process data from other machines. Users are also referred to as network nodes or nodes. Control units are understood below as being regulating or controlling units of any kind, but also, for example, switches and/or switch controllers. Bus systems, for example, including Fieldbus, Profibus, Ethernet, Industrial Ethernet, FireWire, and also PC-internal bus systems (PCI), etc., but in particular also isochronous realtime Ethernet, are employed as data networks.

Data networks make communication between several users possible by networking, which is to say interconnecting individual said users. Communication here denotes the transmission of data between said users. The data being transmitted is thereby sent in the form of data telegrams, which is to say the data is packed into a plurality of packets and sent in this form to the relevant recipient over the data network. The term "data packets" is accordingly also used. The term "trans-mission of data" is here used synonymously with the above-mentioned transmission of data telegrams or data packets.

In distributed automation systems, in the area of, for example, drive engineering, specific data has to be received at specific times by the users for which it is intended and processed by the recipients. The term realtime-critical data or, as the case may be, data traffic is used here because, in contrast to non-realtime-critical, for example internet-based or, as the case may be, intranet-based data communication, failure of the data to arrive at its destination at the proper time will have undesired results for the user. According to IEC 61491, EN61491 SERCOS interface—Brief Technical Description (http://www.sercos.de/deutsch/index deutsch.htm), it is possible to ensure successful realtime-critical data traffic of said type in distributed automation systems.

Today's automation components (for example controls, drives, . . . ) generally have an interface to a cyclically clocked communication system. A flow level of the automation component (fast cycle) (for example position regulation in a control, torque regulation of a drive) is synchronized with the communication cycle. This determines the communication clock. Other, low-performance algorithms (slow cycle) (temperature controls, for example) of the automation component can also only communicate with other components (for example binary switches for ventilators, pumps, . . . ) via this communication clock, although a slower cycle would suffice. The use of only one communication clock for transmitting all the information in the system places stringent demands on the bandwidth of the transmission link.

Very fast and reliable communication systems with predictable response times are essential for process control and monitoring in automated production, and in particular in the case of digital drive systems.

German patent application DE 100 58 524.8 discloses a system and method for transmitting data over switchable data networks, in particular the Ethernet, which permits the mixed operation of realtime-critical and non-realtime-critical communication, in particular internet-based or, as the case may be, intranet-based data communication.

This makes both realtime-critical (RT: Realtime) and non-realtime-critical (NRT: Non-realtime) communication possible in a switchable data network consisting of users and switching units of, for example, a distributed automation system, by means of cyclical operation.

In what is termed a transmission cycle, for all users and switching units of the switchable data network there is in each case at least one time range for transmitting realtime-critical and at least one time range for transmitting non-realtime-critical data, as a consequence of which realtime-critical is separated from non-realtime-critical communication. As users and switching units are always all synchronized with a common time base, the respective time ranges for transmitting data operate at the same time for all users and switching units, which is to say realtime-critical communication takes place temporally independently of non-realtime-critical communication and so is not influenced by it.

Realtime-critical communication is planned in advance. The injection of the data telegrams at the original sender's side and the forwarding of said telegrams by means of the participating switching units takes place on a time basis. Through buffering in the respective switching units, spontaneous, internet-enabled, non-realtime-critical communication arising at any time is relocated to the transmission time range of a transmission cycle provided for non-realtime-critical communication and is only transmitted there.

This patent application presents, by way of example, the embodiment of a basic structure of a transmission cycle which is divided into two time ranges. A transmission cycle is divided into a first time range, which is provided for transmitting realtime-critical data, and a second time range, which is provided for transmitting non-realtime-critical data. The length of the transmission cycle presented symbolizes its temporal duration, which is advantageously between, for example, a few microseconds and a few seconds, depending on the intended purpose.

Although the length of a transmission cycle can be changed, it is specified at least once ahead of the data transmission time by means of, for example, a control computer, and is in each case of equal length for all users and switching units of the switchable data network. The length of a transmission cycle and/or the length of the first time range provided for transmitting realtime-critical data can be changed at any time, for example at pre-planned, fixed times and/or after a planned number of transmission cycles, advantageously before the start of a transmission cycle, by means, for example, of the control computer's switching over to other planned, realtime-critical transmission cycles.

Moreover, the control computer can at any time, depending on the requirements, perform re-planning of realtime communication during ongoing operation of an automation system, as a consequence of which the length of the RT partial cycle can be changed. The absolute length of a transmission cycle remains constant during ongoing operation and is a measure of the temporal portion, or, as the case may be, of the bandwidth of non-realtime-critical communication during a transmission cycle, which is to say of the time available for non-realtime-critical communication.

For a length of realtime-critical communication of 350 µs and a transmission cycle of 500 µs, for example, non-realtime-critical communication accordingly has a bandwidth of 30%, and for 10 ms a bandwidth of 97%. In the first time range provided for transmitting realtime-critical data a certain length of time is reserved prior to transmission of the actual realtime-critical data telegrams for sending data telegrams for organizing the data transmission.

The data telegrams for organizing the data transmission contain, for example, data for synchronizing the users and switching units of the data network and/or data for recognizing the network's topology. The realtime-critical data telegrams are transmitted after these data telegrams have been transmitted. Since realtime communication can be planned in advance by the cyclical operation, the transmission times or, as the case may be, the times for forwarding the realtime-critical data telegrams are known for all realtime-critical data telegrams being transmitted prior to the start of data transmission, which is to say the length of time of the time range for transmitting non-realtime-critical data is automatically determined by the length of time of the time range for transmitting realtime-critical data.

An advantage of this arrangement is that only the necessary transmission time for the realtime-critical data traffic is used in each case and that on completion of said traffic the remaining time is automatically available for non-realtime-critical communication, for example for internet communication which cannot be planned or, as the case may be, for other non-realtime-critical applications.

It is particularly advantageous that the length of time of the time range for transmitting realtime-critical data is in each case determined by the data being transmitted on a connection-specific basis, which is to say the length of time of the two time ranges is determined for each individual data connection by the respectively necessary volume of data of the realtime-critical data being transmitted, as a consequence of which the temporal division of the two time ranges for each individual data connection can be different for each transmission cycle.

Only the necessary transmission time for the realtime-critical data traffic is used in each case and the remaining time of a transmission cycle is automatically available for all users of the switchable data network for non-realtime-critical communication, for example for internet communication which cannot be planned or, as the case may be, for other non-realtime-critical applications.

Realtime communication being appropriately planned in advance such that the realtime-critical data telegrams under consideration arrive at or in the corresponding switching units at or before the forwarding time, said realtime-critical data telegrams can be transmitted or, as the case may be, forwarded without a temporal pause, so that optimum use is made of the available length of time thanks to the densely packed transmission, or, as the case may be, forwarding. It is, however, of course also possible to insert pauses in transmission between transmissions of the individual data telegrams.

The basic mode of operation in a switched network is explained—in an exemplary manner by way of representation for any network—below using two users, for example a drive and a control computer, with in each case integrated switching units and another user without a switching unit which are interconnected by means of data connections. The switching units each have local memories connected to the users via internal interfaces.

The users exchange data with the relevant switching units over the interfaces. The local memories are connected within the switching units to the control units via the data connections. The control units receive or, as the case may be, forward data over the internal data connections from or, as the case may be, to the local memories or via one or more of the external ports. The switching units always have a common synchronous time base as a result of applying the method for synchronizing. If a user has realtime-critical data, said data is fetched at the pre-planned time during the time range for realtime-critical communication via the relevant interface and via the local memory by the relevant control unit and transmitted from there to the next connected switching unit via the external port provided.

If another user transmits non-realtime-critical data, for example for an internet inquiry, at the same time, which is to say during realtime-critical communication, said data is received by the control unit via the external port and forwarded via an internal connection to the local memory and buffered there. Not until during the time range for non-realtime-critical communication is it fetched again from there and forwarded to the recipient, which is to say it is relocated into the second time range of the transmission cycle reserved for spontaneous, non-realtime-critical communication, as a consequence of which disruptions to realtime communication are precluded.

For the event of its not being possible to transmit all the buffered, non-realtime-critical data during the time range of a transmission cycle provided for transmitting the non-realtime-critical data, said data will remain buffered in the relevant switching unit's local memory until it can be transmitted during a time range of a later transmission cycle provided for transmitting the non-realtime-critical data, as a consequence of which disruptions to realtime communication are always precluded.

The realtime-critical data telegrams arriving over relevant data connections at the associated switching unit's control unit via the external ports are forwarded directly over the relevant external ports. This is possible because realtime communication has been planned in advance so the transmit and receive time is known for all realtime-critical data telegrams being transmitted, as are all respectively participating switching units, and all times for forwarding, and all recipients of the realtime-critical data telegrams.

It is also ensured thanks to realtime communication having been planned in advance that there will be no data collisions on the data connections. The forwarding times of all realtime-critical data packets from the respectively participating switching units have likewise been planned in advance and hence clearly defined. The arrival of the realtime-critical data telegrams has thus been planned such that the realtime-critical data telegrams under consideration will arrive in the relevant switching unit's control unit no later, or sooner, than the forwarding time. This thereby eliminates the problem of temporal non-clarity apparent particularly in the case of long transmission chains.

It is possible by means of the method described in German patent application DE 100 58 524.8 to set up Ethernet-based communication networks, in particular isochronous Ethernet-based communication networks, whose nodes operate synchronously in the sub-microsecond range, and which carry out cyclical communication precisely at the planned times (isochronous realtime communication) independently of any other, spontaneous communication (NRT communication or non-realtime communication) on or, as the case may be, in said network.

All participants in isochronous realtime communication must, however, be based on specific communication hardware in order to achieve time synchronicity, and send telegrams precisely at the planned time.

The prior art does not permit the incorporation into isochronous realtime communication, referred to below as IRT communication, of users with an existing Ethernet connection for which said specific hardware has not been provided.

SUMMARY OF INVENTION

The object of the invention is accordingly to disclose an improved method for operating an end user of an isochronous cyclical communication system permitting the connection to a communication system of a said type of end user not provided with specific hardware support of said type. A further object of the invention is to disclose a corresponding end user, connecting user, and computer program products.

The objects of the invention are respectively achieved by means of the features of the independent claims. Preferred embodiments of the invention will emerge from the dependent claims.

The present invention starts from the knowledge that the latency between a data telegram's arrival at a user, for example an Ethernet user, and the triggering of a corresponding interrupt is constant and capable of being determined if the receive buffer is empty, which is to say no telegrams have been stored in the end user's receive path. An empty receive path of said type is referred to below as an empty connection.

To achieve approximate synchronizing of the end user with the time base of the isochronous cyclical communication system, the end user receives synchronizing data telegrams from an immediately adjacent connecting user in different communication cycles. Synchronizing data telegrams of said type are employed within the isochronous cyclical communication system for synchronizing the time bases of the individual users of the communication system. Precise synchronizing, as takes place for the users of the isochronous communication system, is not possible on account of the lack of hardware support in the end user. The time base in the end user is synchronized instead with a tolerance resulting from the overall transmission time between the connecting user and end user.

According to a preferred embodiment of the invention, the end user has a receive buffer. When the receive buffer it filled to its maximum capacity, the end user requires a maximum emptying time to empty the receive buffer. If there is a receive buffer in the end user, the overall transmission time of a synchronizing data telegram will therefore only be determined if the end user's receive buffer is empty when the synchronizing data telegram is received.

A synchronizing data telegram of this type is therefore transmitted in this embodiment by the connecting user no earlier than after a pause in transmission after the start of the communication cycle, with said pause in transmission corresponding to the maximum emptying time. This will ensure that a synchronizing data telegram sent by the connecting user to the end user will encounter an empty receive buffer of the end user and hence that the overall transmission time is independent of the length of a data telegram previously received by the end user.

So that a data telegram can be injected into the isochronous cyclical communication system by the end user with the imprecisely synchronized time base, according to the invention a data telegram of said type is always sent by the end user to its adjacent connecting user no earlier than at the start of the communication cycle and no later than by the length of tolerance time of synchronizing the end user's time base before the connecting user's forwarding time. Because the data telegram is sent at a time preceding the forwarding time at least by the length of tolerance time, it is ensured that the connecting user will receive the data telegram from the end user no later than at a time which will enable forwarding of the data telegram according to the planned time of forwarding.

To summarize, the disclosed invention is a system and method for realtime communication in communication systems with users without hardware support for realtime capability and with users with hardware support for realtime capability, wherein the propagation time, in particular the constant propagation time of a telegram from a second user to a first user, is used to synchronize the first user with all other users, the propagation time, in particular the constant propagation time of a telegram of said type, is guaranteed by means of a preceding pause in transmission, the owing to a receive buffer at the second user, the first user is able to send realtime telegrams in a temporally imprecise manner and only forwarding from said receive buffer has to take place with a high degree of time accuracy, the receive buffer at the second user is able to buffer several telegrams of the first user.

It is, moreover, particularly advantageous that the disclosed methods can be employed or utilized in automation systems, in particular for and in packaging machines, presses, plastics injection-molding machines, textile machines, printing machines, machine tools, robots, handling systems, timber processing machines, glass processing machines, ceramics processing machines, and hoisting gear.

BRIEF DESCRIPTION OF THE DRAWINGS

Preferred exemplary embodiments of the invention are explained in more detail below with reference to the drawings.

DETAILED DESCRIPTION OF INVENTION

Figure 1:
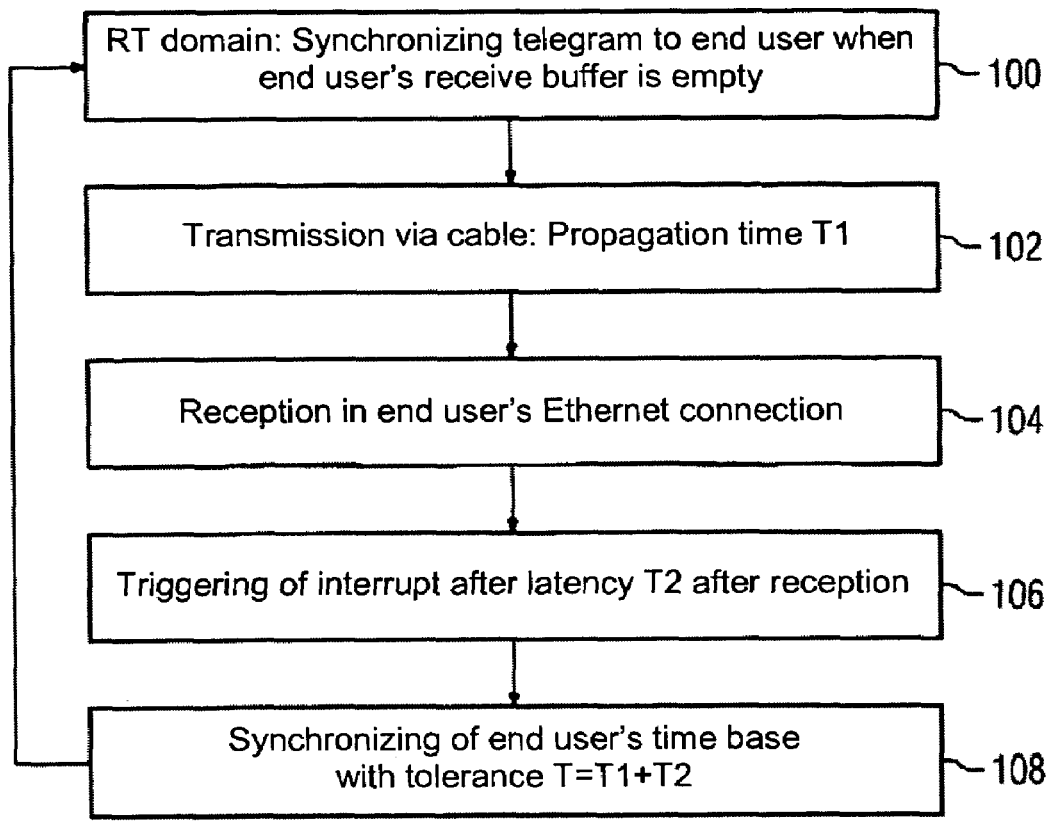
FIG. 1: shows an embodiment of a method according to the invention for synchronizing the time base of an end user without hardware support.

FIG. 1 is a flowchart of synchronizing an end user's time base. In step 100, a synchronizing data telegram is sent from a connecting user situated immediately adjacent to the end user and located in the realtime domain of an isochronous cyclical communication system to the end user, with said end user's receive buffer being empty at the transmit time or at least at the receive time which can be pre-determined.

The synchronizing data telegram is transmitted in step 102 over a cable interconnecting the connecting user and end user. Said transmission is subject to a propagation time T1.

The synchronizing data telegram is received in step 104 in the receive buffer of the end user's empty connection. An interrupt is triggered in step 106 after a determined latency T2 following reception. The contents of the synchronizing data telegram are evaluated owing to the interrupt and the end user's time base is adjusted accordingly. Said synchronizing of the time base of the end user with tolerance T=T1+T2 takes place in step 108.

Step 100 is repeated a certain period of time later, which is to say that another synchronizing data telegram is sent by the connecting user. This corresponds to the procedure in the realtime domain because the users' time bases also need to be adjusted from time to time.

Figure 2:
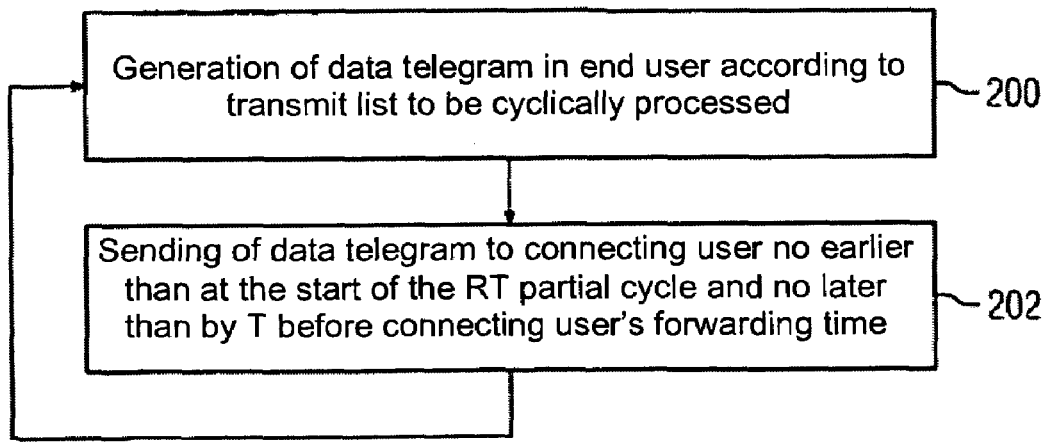
FIG. 2: is a flowchart of the sending of data telegrams by the end user with the imprecisely synchronized time base.

FIG. 2 shows the procedure for sending data telegrams from the end user into the isochronous cyclical communication system. A data telegram is generated in the end user in step 200 according to a transmission list to be processed cyclically. Said transmission list is produced while the communication system is being planned.

The planned data telegram is sent in step 202 to the immediately adjacent connecting user. It is sent no earlier than at the start of the communication cycle and no later than at a time T before the connecting user's forwarding time. If the communication system has a communication cycle which can be divided into a realtime (RT) partial cycle and a non-realtime (NRT) partial cycle, the data telegram will be sent no earlier than at the start of the RT partial cycle.

Figure 3:
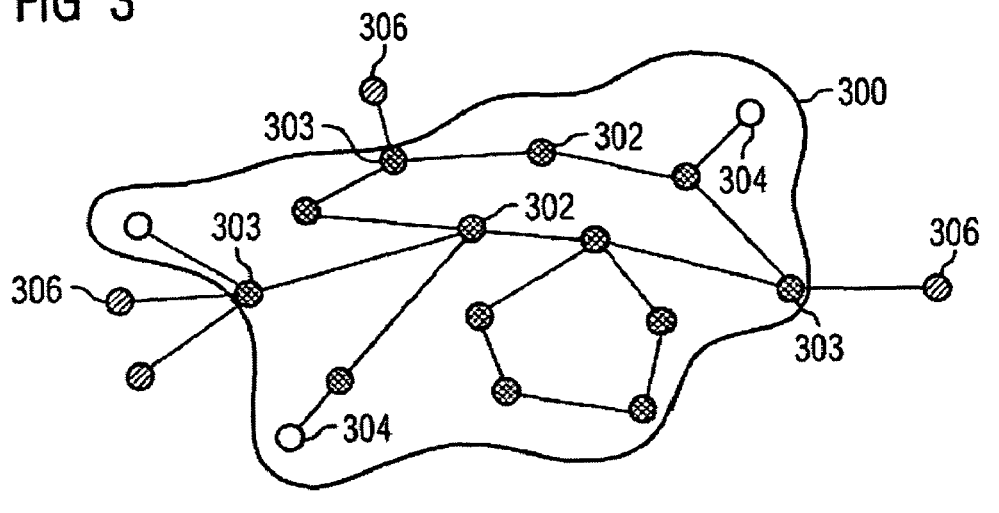
FIG. 3: shows an embodiment of a communication system according to the invention.

FIG. 3 is a schematic of an embodiment of a system according to the invention. Said system includes a communication system 300 which is suitable for isochronous cyclical realtime communication. Connecting users 302 and 303 and end users 304 belong to communication system 300. Both connecting users 302 and 303 and end users 304 have specific hardware support for attaining a high degree of time accuracy of the synchronicity of the time bases and for attaining a fast data throughput rate and a large number of telegrams.

Also connected to communication system 300 via connecting users 303 are end users 306 not having specific hardware support of this type. Said end users 306 are approximately synchronized, for example according to the embodiment shown in FIG. 1, with the time base of communication system 300 and send data telegrams according to the embodiment shown in FIG. 2 into communication system 300.

Figure 4:
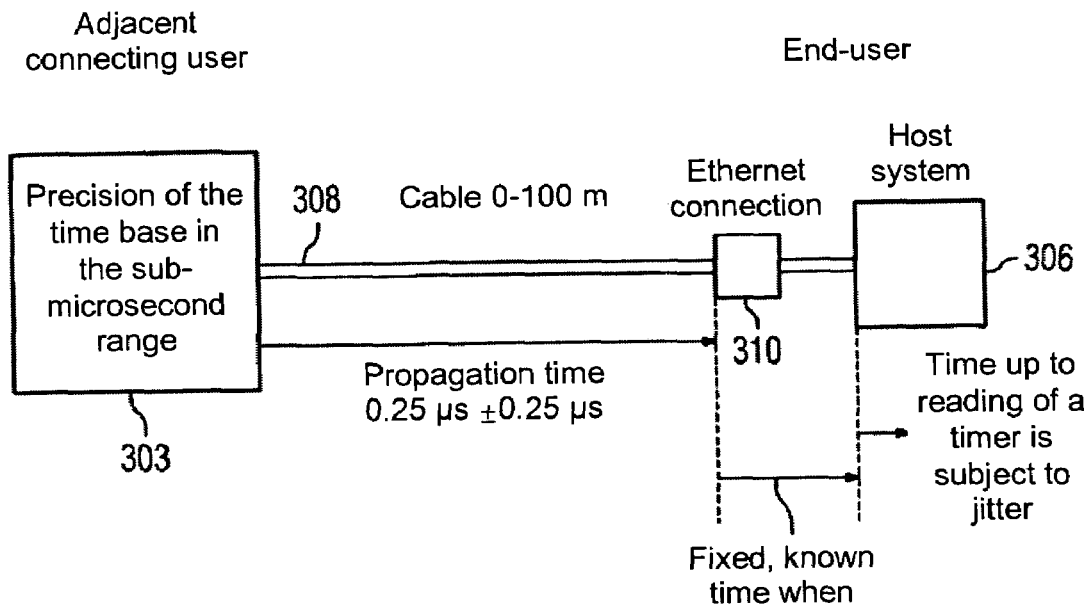
FIG. 4: is a schematic of synchronizing and of determining the propagation time.

FIG. 4 shows a possible procedure for determining the tolerance T (see also FIG. 1).

In the exemplary embodiment shown, one of the connecting users 303 is connected via a cable 308 to one of the end users 306. A transmission link between connecting user 303 and an Ethernet connection 310 of end user 306 is provided by means of cable 308. Said cable 308 has a maximum length of, for instance, 100 meters, giving a propagation time T1 of 0.25 ms±0.25 ms.

When the receive buffer of Ethernet connection 310 is empty, the time up to the triggering of an interrupt in end user 306 is determined and constant. A jitter of the interrupt latency may in certain circumstances be added to this, giving in total the latency T2 after reception of the data telegram in the Ethernet connection 310. The time base of end user 306 is then adjusted with tolerance T.

Figure 5:
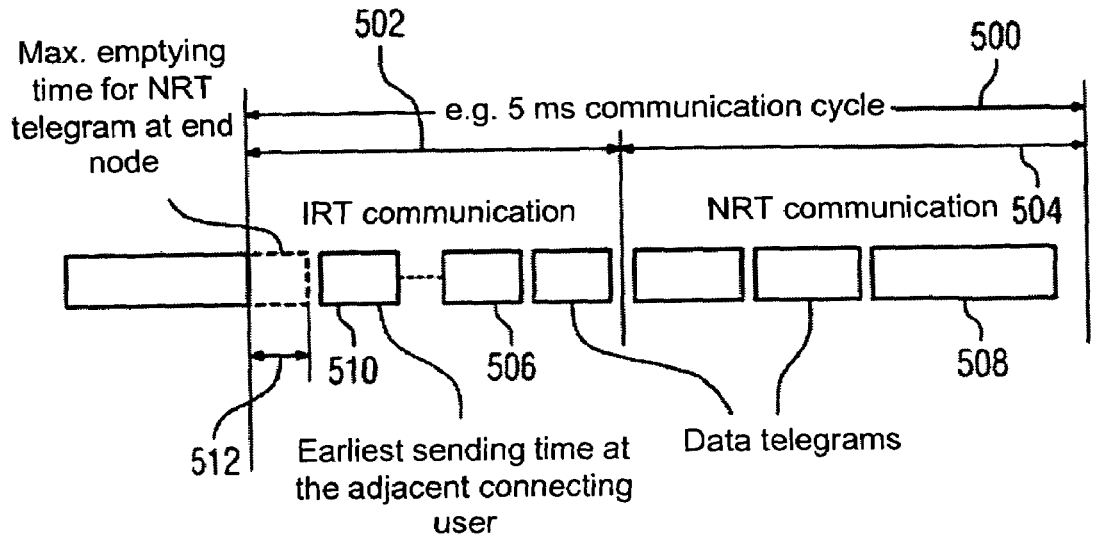
FIG. 5: is a representation clarifying the necessary pause in transmission at the connecting user.

FIG. 5 shows a communication cycle 500 of a connecting user of communication system 300 (see also FIG. 3) of, for example, 5 ms. Communication cycle 500 is divided into a partial cycle 502 for realtime communication and a partial cycle 504 for non-realtime communication. Realtime data telegrams 506 or, as the case may be, non-realtime data telegrams 508 are sent both during partial cycle 502 and during partial cycle 504 by, for example, connecting user 303.

In the exemplary embodiments under consideration here, data telegram 510 in partial cycle 502 is a synchronizing data telegram. Said telegram is sent from connecting user 303 to its adjacent end user 306 (see also FIG. 3). In the exemplary embodiment under consideration here, the end user has a receive buffer in its Ethernet connection 310 (see also FIG. 4). End user 306 requires a maximum emptying time to completely empty the receive buffer.

So that the time base in end user 306 can be synchronized with tolerance T, the connecting user does not send data telegram 510 until after a pause in transmission 512 after the start of partial cycle 502, with the pause in transmission being approximately the same length as the maximum emptying time. Said pause in transmission 512 can also be selected to be slightly shorter than the maximum emptying time because the propagation time T1 from end user 306 can, of course, also be used for emptying of the receive buffer.

For synchronizing the time base of an end user of this type, use is therefore preferably made of the property of customary Ethernet connections, namely that the propagation time between the arrival of a telegram and the triggering of an interrupt is constant and capable of being determined, when the telegram encounters a connection in whose receive buffer no telegrams have been stored. The realtime (RT) telegrams being sent to the end user are therefore planned such that the first telegram being received is guaranteed to encounter an empty connection at the end user.

The thereby attainable synchronicity of a user with a customary Ethernet connection is therefore determined virtually exclusively by the jitter of the interrupt latency. A degree of precision for time synchronicity in the single-digit microsecond range can therefore be attained in the case of dedicated systems. To achieve greater time tolerance for arriving realtime data telegrams, each port of a forwarding user is preferably given a receive buffer which is able to store a telegram in its entire length for "any" length of time, is able to store several telegrams simultaneously up to an overall size corresponding to that of the receive buffer, and is organized on a FIFO (First-In First-Out) basis in such a way that, on the one hand, the telegrams can always be fetched in accordance with their sequence of arrival but also that an arriving telegram can be fetched, which is to say forwarded, immediately on starting to arrive.

Figure 6:
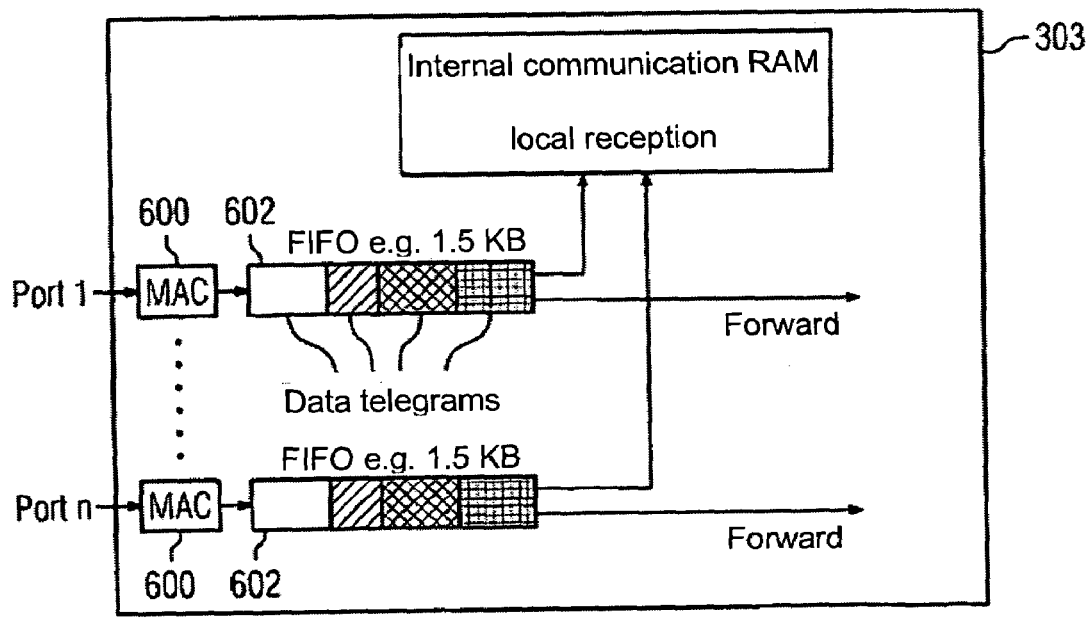
FIG. 6: is a schematic of buffering in the connecting user's receive buffer.

A corresponding embodiment of connecting user 303 (see also FIG. 3 and FIG. 4) is shown in the block diagram in FIG. 6. The connecting user has various ports 1 . . . n. Said ports are each connected to a receive module 600.

Receive modules 600 are in turn each connected to a FIFO receive buffer 602 with a size of, for example, 2 Kbyte.

Stored in receive buffer 602 are various data telegrams which can be forwarded for local reception to an internal communication RAM 604 and/or which can be forwarded to another user of the communication system (see also communication system 300 in FIG. 3).

The presence of receive buffers 602 therefore also enables connecting user 303 to receive data telegrams from end users 306 substantially in advance of the planned forwarding time or, as the case may be, receive time.

Figure 7:
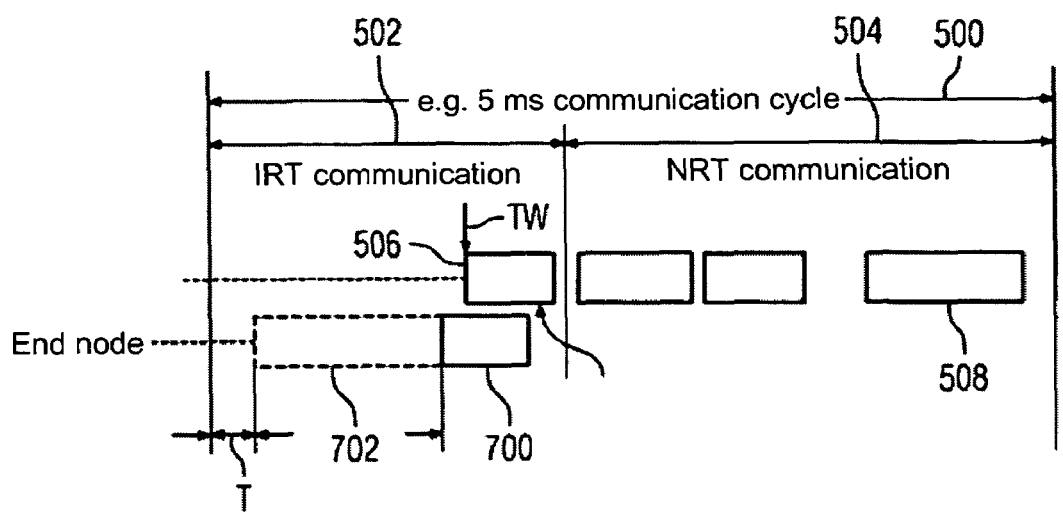
FIG. 7: is a representation clarifying the transmit and receive times.

FIG. 7 is a timing diagram clarifying the timing conditions for the reception of a data telegram from an end user (see also end user 306 in FIG. 3 and FIG. 4).

A data telegram 700 from the end user can be received by connecting user 303 no earlier than by the length of tolerance time T after the start of partial cycle 502 for realtime communication. Following directly on from this is a time window 702 within which data telegram 700 can be received by the connecting user.

The length of time window 702 is limited by the condition that at least a first part of data telegram 700 must have been received at the planned forwarding time TW of data telegram 506 so that said telegram can be forwarded as data telegram 506 by means of what is termed a cut-through method. To ensure this, end user 306 must consequently dispatch data telegram 307 at least by the length of tolerance time T before the planned forwarding time TW.

The invention claimed is:

1. A method for operating an end user of an isochronous cyclical communication system comprising:
   providing a communication cycle of a connecting user having a first partial cycle for realtime communications and a second partial cycle for non-realtime communications;
   receiving a synchronizing data telegram, sent by the connecting user during the first partial cycle, by the end user, the synchronizing data telegram being subject to the propagation time of a transmission link between the connecting user and end user, and wherein the propagation time includes the propagation time of the synchronizing data telegram over a transmission link and the latency for triggering an interrupt in a connection of the end user;
   synchronizing a time base of the end user with the aid of the synchronizing data telegram, resulting in synchronizing of the time base with a tolerance corresponding to the propagation time;
   processing a transmission list from the end user within a communication cycle according to the end user's time base; and
   planning and executing transmission of a synchronizing data telegram from the connecting user, during the first partial cycle of a communication cycle, in accordance with the transmission list from the end user to the connecting user, and no earlier than at the start of the communication cycle and no later than by the tolerance before the planned forwarding time of the relevant data telegram, wherein the synchronizing data telegram is received by the end user when the end user's receive buffer is empty; and
   transmitting a realtime data telegram from the connecting user during the same first partial cycle wherein:
      the synchronizing data telegram is sent by the connecting user no earlier than after a maximum emptying time of the receive buffer of the end user after the start of the communication cycle.

2. A method for operating an end user of an isochronous cyclical communication system comprising:
   receiving a synchronizing data telegram from a connecting user of the communication system by the end user, wherein:
      the synchronizing data telegram is subject to the propagation time of a transmission link between the connecting user and end user, and
      the propagation time comprises the propagation time of the synchronizing data telegram over a transmission link and the latency for triggering an interrupt in a connection of the end user;
   synchronizing a time base of the end user with the aid of the synchronizing data telegram, resulting in synchronizing of the time base with a tolerance corresponding to the propagation time;
   processing a transmission list from the end user within a communication cycle according to the end user's time base; and
   transmitting a data telegram by the connecting user in accordance with the transmission list from the end user to the connecting user no earlier than at the start of the communication cycle and no later than by the tolerance before the planned forwarding time of the relevant data telegram, wherein the synchronizing data telegram is received by the end user when the end user's receive buffer is empty, wherein:
      the synchronizing data telegram is sent by the connecting user no earlier than after a maximum emptying time of the receive buffer of the end user after the start of the communication cycle.

3. An end user of an isochronous cyclical communication system comprising:
   a mechanism for the receiving of a synchronizing data telegram from a connecting user of the communication system by the end user, the synchronizing data telegram being subject to the propagation time of a transmission link between the connecting user and end user, and the propagation time consisting of the propagation time of the synchronizing data telegram over a transmission link and the latency for triggering an interrupt in a connection of the end user;
   a mechanism for synchronizing a time base of the end user with the aid of the synchronizing data telegram, resulting in synchronizing of the time base with a tolerance corresponding to the propagation time;
   a mechanism for the cyclical processing of a transmission list from the end user within of a communication cycle according to the end user's time base, wherein:
   the transmitting of a data telegram is carried out by the connecting user in accordance with the transmission list from the end user to the connecting user no earlier than at the start of the communication cycle and no later than by the tolerance before the planned forwarding time of the relevant data telegram,
   the synchronizing data telegram is received by the end user when the end user's receive buffer is empty, and
   the synchronizing data telegram is sent by the connecting user no earlier than after a maximum emptying time of the receive buffer of the end user after the start of the communication cycle.

4. A communication system comprising:
at least one end user, the end user comprising:
- a mechanism for the receiving of a synchronizing data telegram from a connecting user of the communication system by the end user, wherein the synchronizing data telegram being subject to the propagation time of a transmission link between the connecting user and end user, and wherein the propagation time consisting of the propagation time of the synchronizing data telegram over a transmission link and the latency for triggering an interrupt in a connection of the end user;
- a mechanism for synchronizing a time base of the end user with the aid of the synchronizing data telegram, resulting in synchronizing of the time base with a tolerance corresponding to the propagation time;
- a mechanism for the cyclical processing of a transmission list from the end user within of a communication cycle according to the end user's time base, wherein the transmitting of a data telegram is carried out by the connecting user in accordance with the transmission list from the end user to the connecting user no earlier than at the start of the communication cycle and no later than by the tolerance before the planned forwarding time of the relevant data telegram, and wherein
- the synchronizing data telegram is received by the end user when the end user's receive buffer is empty; and at least one connecting user, the connecting user comprising:
- a mechanism for sending a synchronizing data telegram to an end user over a transmission link subject to a propagation time, wherein the propagation time consisting of the propagation time of the synchronizing data telegram over a transmission link and the latency for triggering an interrupt in a connection of the end user, wherein the synchronizing data telegram being sent no earlier than after a pause in transmission after the start of the communication cycle, wherein the pause in transmission corresponding to a maximum emptying time of a receive buffer of the end user, and with the synchronizing data telegram being received by the end user when the end user's receive buffer is empty.

5. A method for operating an end user of an isochronous cyclical communication system comprising:
receiving a synchronizing data telegram from a connecting user of the communication system by the end user, wherein:
- the synchronizing data telegram is subject to the propagation time of a transmission link between the connecting user and end user; and
- the propagation time comprises the propagation time of the synchronizing data telegram over a transmission link and the latency for triggering an interrupt in a connection of the end user;

synchronizing a time base of the end user with the aid of the synchronizing data telegram, resulting in synchronizing of the time base with a tolerance corresponding to the propagation time;
processing a transmission list from the end user within a communication cycle according to the end user's time base; and
transmitting a data telegram by the connecting user in accordance with the transmission list from the end user to the connecting user no earlier than at the start of the communication cycle and no later than by the tolerance before the planned forwarding time of the relevant data telegram, wherein the synchronizing data telegram is received by the end user when the end user's receive buffer is empty, wherein:
the communication cycle is divided into a first partial cycle for realtime communication and into a second partial cycle for non-realtime communication and wherein the data telegram is transmitted in the partial cycle for realtime communication, and the synchronizing data telegram is sent by the connecting user no earlier than after a maximum emptying time of the receive buffer of the end user after the start of the communication cycle.

* * * * *